US 7,805,422 B2

(12) United States Patent
Fang et al.

(10) Patent No.: US 7,805,422 B2
(45) Date of Patent: Sep. 28, 2010

(54) CHANGE NOTIFICATION QUERY MULTIPLEXING

(75) Inventors: Lijiang Fang, Bellevue, WA (US); Hua Yuan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 568 days.

(21) Appl. No.: 11/067,778

(22) Filed: Feb. 28, 2005

(65) Prior Publication Data

US 2006/0195456 A1 Aug. 31, 2006

(51) Int. Cl.
*G06F 7/00* (2006.01)
*G06F 17/00* (2006.01)

(52) U.S. Cl. .................. 707/702; 707/687; 707/705; 707/759; 707/783

(58) Field of Classification Search .................. 707/201, 707/702, 687, 705, 759, 783
See application file for complete search history.

(56) References Cited

U.S. PATENT DOCUMENTS

| 5,097,533 | A | 3/1992 | Burger et al. |
| 5,388,257 | A | 2/1995 | Bauer |
| 5,442,779 | A | 8/1995 | Barber et al. |
| 5,485,617 | A | 1/1996 | Stutz et al. |
| 5,630,114 | A | 5/1997 | Serra et al. |
| 5,684,984 | A | 11/1997 | Jones et al. |
| 5,742,813 | A | 4/1998 | Kavanagh et al. |
| 5,758,153 | A | 5/1998 | Atsatt et al. |
| 5,774,717 | A | 6/1998 | Porcaro et al. |
| 5,799,307 | A | 8/1998 | Buitron |
| 5,806,074 | A | 9/1998 | Souder et al. ............... 707/21 |
| 5,815,415 | A | 9/1998 | Bentley et al. |
| 5,832,496 | A | 11/1998 | Anand et al. |
| 5,842,213 | A | 11/1998 | Odom et al. |
| 5,845,067 | A | 12/1998 | Porter et al. |
| 5,864,683 | A | 1/1999 | Boebert et al. |
| 5,893,106 | A | 4/1999 | Brobst et al. ............... 707/102 |
| 5,900,870 | A | 5/1999 | Malone et al. ............... 345/333 |
| 5,905,987 | A | 5/1999 | Shutt et al. |
| 5,937,189 | A | 8/1999 | Branson et al. |

(Continued)

FOREIGN PATENT DOCUMENTS

EP 0 974 895 1/2000

(Continued)

OTHER PUBLICATIONS

If A1 is the Answer, What was the Question? An Edgy Na'if's Retrospective on Promulgating the Trusted Computer Systems Evaluation Criteria, by Marvin Schaefer, 20th Annual Computer Security Applications Conference, 2004, Publication Date: Dec. 6-10, 2004, pp. 204-228.*

(Continued)

*Primary Examiner*—Jay A Morrison
(74) *Attorney, Agent, or Firm*—Woodcock Washburn LLP

(57) ABSTRACT

In order to efficiently handle change notification requests to a storage system based on a database data store and a database engine, the change notification requests are multiplexed. This can be done by issuing a query which refers, for information about what changes are being tracked, to a data structure. The information about what changes to track for each request to be multiplexed is stored in the data structure. Additionally, information about the request can be stored in the data structure. By adding information to the data structure, the query can be altered without needing to directly modify or reissue the query.

14 Claims, 8 Drawing Sheets

U.S. PATENT DOCUMENTS

| | | | |
|---|---|---|---|
| 5,937,402 A | 8/1999 | Pandit | |
| 5,937,406 A | 8/1999 | Balabine et al. | |
| 5,953,514 A | 9/1999 | Gochee | |
| 6,006,234 A | 12/1999 | Govindarajan et al. | |
| 6,018,342 A | 1/2000 | Bristor | |
| 6,047,291 A | 4/2000 | Anderson et al. | 707/103 |
| 6,058,389 A * | 5/2000 | Chandra et al. | 707/1 |
| 6,085,192 A | 7/2000 | Mendez et al. | |
| 6,096,094 A | 8/2000 | Kay et al. | |
| 6,108,004 A | 8/2000 | Medl | 345/346 |
| 6,108,661 A | 8/2000 | Caron et al. | |
| 6,112,024 A | 8/2000 | Almond et al. | 395/703 |
| 6,151,606 A | 11/2000 | Mendez | |
| 6,189,000 B1 | 2/2001 | Gwertzman et al. | |
| 6,195,650 B1 | 2/2001 | Gaither et al. | |
| 6,199,195 B1 | 3/2001 | Goodwin et al. | 717/1 |
| 6,212,512 B1 | 4/2001 | Barney et al. | |
| 6,233,582 B1 | 5/2001 | Traversat et al. | |
| 6,237,143 B1 | 5/2001 | Fontana et al. | |
| 6,240,414 B1 | 5/2001 | Beizer et al. | 707/8 |
| 6,263,339 B1 | 7/2001 | Hirsch | |
| 6,317,754 B1 | 11/2001 | Peng | |
| 6,324,533 B1 | 11/2001 | Agrawal et al. | |
| 6,338,056 B1 | 1/2002 | Dessloch et al. | 707/2 |
| 6,343,287 B1 | 1/2002 | Kumar et al. | 707/4 |
| 6,345,288 B1 | 2/2002 | Reed et al. | |
| 6,349,313 B1 | 2/2002 | Momoh et al. | |
| 6,370,541 B1 | 4/2002 | Chou et al. | 707/103 |
| 6,418,438 B1 | 7/2002 | Campbell | |
| 6,427,123 B1 | 7/2002 | Sedlar | |
| 6,430,564 B1 | 8/2002 | Judge et al. | |
| 6,438,545 B1 | 8/2002 | Beauregard et al. | |
| 6,442,548 B1 | 8/2002 | Balabine et al. | |
| 6,442,620 B1 | 8/2002 | Thatte et al. | |
| 6,446,092 B1 | 9/2002 | Sutter | |
| 6,449,659 B1 | 9/2002 | Caron et al. | |
| 6,473,851 B1 | 10/2002 | Plutowski | |
| 6,477,527 B2 | 11/2002 | Carey et al. | |
| 6,477,564 B1 | 11/2002 | Freyssinet et al. | 709/202 |
| 6,519,597 B1 | 2/2003 | Cheng et al. | 707/10 |
| 6,857,053 B2 | 2/2003 | Bolik et al. | |
| 6,701,314 B1 | 3/2003 | Conover et al. | |
| 6,546,393 B1 | 4/2003 | Khan | |
| 6,553,391 B1 | 4/2003 | Goldring et al. | |
| 6,556,983 B1 | 4/2003 | Altschuler et al. | 706/55 |
| 6,571,245 B2 | 5/2003 | Huang et al. | |
| 6,578,046 B2 | 6/2003 | Chang et al. | 707/103 |
| 6,591,266 B1 * | 7/2003 | Li et al. | 707/10 |
| 6,601,234 B1 | 7/2003 | Bowman-Amuah | |
| 6,633,869 B1 | 10/2003 | Duparcmeur et al. | |
| 6,643,652 B2 | 11/2003 | Helgeson et al. | |
| 6,671,757 B1 | 12/2003 | Multer et al. | 710/100 |
| 6,694,321 B1 | 2/2004 | Berno | |
| 6,694,336 B1 | 2/2004 | Multer et al. | 707/201 |
| 6,697,818 B2 | 2/2004 | Li et al. | 707/103 R |
| 6,704,743 B1 | 3/2004 | Martin | |
| 6,708,221 B1 | 3/2004 | Mendez et al. | |
| 6,711,560 B2 * | 3/2004 | Levy et al. | 707/1 |
| 6,714,943 B1 | 3/2004 | Ganesh et al. | |
| 6,728,719 B1 | 4/2004 | Ganesh et al. | |
| 6,738,789 B2 | 5/2004 | Multer et al. | 707/201 |
| 6,745,174 B2 * | 6/2004 | Levy et al. | 707/2 |
| 6,757,696 B2 | 6/2004 | Multer et al. | 707/201 |
| 6,763,350 B2 | 7/2004 | Agrawal et al. | 707/3 |
| 6,763,361 B1 | 7/2004 | Poskanzer | |
| 6,772,178 B2 | 8/2004 | Mandal et al. | 707/204 |
| 6,801,604 B2 | 10/2004 | Maes et al. | |
| 6,810,516 B2 | 10/2004 | Lauris | |
| 6,823,349 B1 | 11/2004 | Taylor et al. | |
| 6,826,560 B1 * | 11/2004 | Leymann et al. | 707/3 |
| 6,839,721 B2 | 1/2005 | Schwois | |
| 6,842,906 B1 | 1/2005 | Bowman-Amuah | |
| 6,851,089 B1 | 2/2005 | Erickson et al. | |
| 6,877,111 B2 | 4/2005 | Sharma et al. | |
| 6,889,231 B1 | 5/2005 | Souder et al. | |
| 6,895,586 B1 | 5/2005 | Brasher et al. | |
| 6,952,704 B2 | 10/2005 | MacLeod et al. | |
| 6,961,723 B2 | 11/2005 | Faybishenko et al. | |
| 6,963,882 B1 * | 11/2005 | Elko et al. | 707/200 |
| 6,968,344 B2 | 11/2005 | Bahulkar et al. | |
| 6,976,027 B2 | 12/2005 | Cutlip | |
| 6,986,060 B1 * | 1/2006 | Wong | 726/26 |
| 6,990,513 B2 | 1/2006 | Balfiore et al. | |
| 6,996,844 B2 | 2/2006 | Langford et al. | |
| 6,999,956 B2 | 2/2006 | Mullins | |
| 7,031,973 B2 | 4/2006 | Natarajan et al. | |
| 7,031,974 B1 | 4/2006 | Subramaniam | |
| 7,043,481 B2 | 5/2006 | Mullins et al. | |
| 7,089,293 B2 | 8/2006 | Grosner et al. | |
| 7,099,932 B1 | 8/2006 | Frenkel et al. | |
| 7,099,946 B2 | 8/2006 | Lennon et al. | |
| 7,143,420 B2 | 11/2006 | Radhakrishnan | |
| 7,145,898 B1 | 12/2006 | Elliott | |
| 7,158,962 B2 | 1/2007 | Belfiore et al. | |
| 7,162,469 B2 | 1/2007 | Anonsen et al. | |
| 7,177,843 B2 | 2/2007 | Nguyen et al. | |
| 7,177,865 B2 | 2/2007 | Call | |
| 7,178,100 B2 | 2/2007 | Call | |
| 7,181,450 B2 | 2/2007 | Malloy et al. | |
| 7,191,299 B1 | 3/2007 | Kekre et al. | |
| 7,206,788 B2 | 4/2007 | Horvitz et al. | |
| 7,219,327 B1 | 5/2007 | Jacobs et al. | |
| 7,237,045 B2 | 6/2007 | Beckmann et al. | |
| 7,240,072 B2 | 7/2007 | McKnight et al. | |
| 7,243,103 B2 | 7/2007 | Murphy et al. | |
| 7,249,117 B2 | 7/2007 | Estes | |
| 7,254,574 B2 | 8/2007 | Cunningham et al. | |
| 7,263,551 B2 | 8/2007 | Belfiore et al. | |
| 7,269,664 B2 * | 9/2007 | Hutsch et al. | 709/246 |
| 7,272,598 B2 | 9/2007 | Cunningham et al. | |
| 7,277,928 B2 | 10/2007 | Lennon | |
| 7,349,913 B2 | 3/2008 | Clark et al. | |
| 7,428,546 B2 | 9/2008 | Nori et al. | |
| 7,483,915 B2 | 1/2009 | Thompson et al. | |
| 7,555,497 B2 | 6/2009 | Thompson et al. | |
| 2001/0037412 A1 | 11/2001 | Miloushev et al. | |
| 2002/0019827 A1 | 2/2002 | Shiman et al. | |
| 2002/0059425 A1 | 5/2002 | Belfiore et al. | |
| 2002/0067370 A1 | 6/2002 | Forney et al. | |
| 2002/0069192 A1 | 6/2002 | Aegerter | |
| 2002/0091702 A1 | 7/2002 | Mullins | 707/100 |
| 2002/0095454 A1 | 7/2002 | Reed et al. | |
| 2002/0099713 A1 | 7/2002 | Fernandez et al. | |
| 2002/0120763 A1 | 8/2002 | Miloushev et al. | |
| 2002/0143521 A1 | 10/2002 | Call | 704/1 |
| 2002/0152422 A1 | 10/2002 | Sharma et al. | 714/13 |
| 2002/0156792 A1 | 10/2002 | Gombocz et al. | 707/100 |
| 2002/0158839 A1 | 10/2002 | Hirota et al. | 345/156 |
| 2002/0174180 A1 | 11/2002 | Brown et al. | |
| 2002/0174191 A1 * | 11/2002 | Robertson et al. | 709/217 |
| 2002/0174417 A1 | 11/2002 | Sijacic et al. | |
| 2002/0177993 A1 | 11/2002 | Veditz et al. | |
| 2002/0184163 A1 | 12/2002 | Lotter et al. | |
| 2002/0184401 A1 | 12/2002 | Kadel et al. | |
| 2002/0194388 A1 | 12/2002 | Boloker et al. | |
| 2002/0198891 A1 | 12/2002 | Li et al. | 707/102 |
| 2003/0009685 A1 | 1/2003 | Choo et al. | |
| 2003/0083948 A1 | 5/2003 | Rodriguez et al. | |
| 2003/0084038 A1 * | 5/2003 | Balogh et al. | 707/3 |
| 2003/0088654 A1 | 5/2003 | Good et al. | |
| 2003/0097376 A1 * | 5/2003 | Ortega et al. | 707/104.1 |
| 2003/0101190 A1 | 5/2003 | Horvitz et al. | |
| 2003/0105732 A1 | 6/2003 | Kagalwala et al. | |
| 2003/0110188 A1 | 6/2003 | Howard et al. | |

| | | | |
|---|---|---|---|
| 2003/0110189 A1 | 6/2003 | Agrawal et al. | |
| 2003/0144849 A1 | 7/2003 | Kakivaya et al. | |
| 2003/0158839 A1 | 8/2003 | Faybishenko et al. | 707/3 |
| 2003/0158937 A1* | 8/2003 | Johal et al. | 709/224 |
| 2003/0172368 A1 | 9/2003 | Alumbaugh et al. | |
| 2003/0196052 A1 | 10/2003 | Bolik et al. | |
| 2004/0003091 A1 | 1/2004 | Coulthard et al. | |
| 2004/0024795 A1 | 2/2004 | Hind et al. | 707/204 |
| 2004/0025110 A1 | 2/2004 | Hu | |
| 2004/0031058 A1 | 2/2004 | Reisman | |
| 2004/0068523 A1 | 4/2004 | Keith et al. | |
| 2004/0073560 A1 | 4/2004 | Edwards | |
| 2004/0078568 A1 | 4/2004 | Pham et al. | |
| 2004/0177319 A1 | 9/2004 | Horn | |
| 2004/0193707 A1 | 9/2004 | Alam et al. | |
| 2004/0193952 A1 | 9/2004 | Narayanan et al. | |
| 2004/0199521 A1 | 10/2004 | Anglin et al. | |
| 2004/0215858 A1 | 10/2004 | Armstrong et al. | |
| 2004/0267741 A1* | 12/2004 | Galindo-Legaria et al. | 707/5 |
| 2004/0267834 A1 | 12/2004 | Sasaki | |
| 2004/0268240 A1 | 12/2004 | Vincent, III | 715/513 |
| 2005/0015361 A1 | 1/2005 | Payton et al. | |
| 2005/0015363 A1 | 1/2005 | Dessloch et al. | |
| 2005/0015663 A1 | 1/2005 | Armangau et al. | |
| 2005/0033777 A1 | 2/2005 | Moraes et al. | |
| 2005/0044089 A1 | 2/2005 | Wu et al. | |
| 2005/0044108 A1 | 2/2005 | Shah et al. | |
| 2005/0049994 A1 | 3/2005 | Thompson et al. | |
| 2005/0050053 A1 | 3/2005 | Thompson et al. | |
| 2005/0055354 A1 | 3/2005 | Thompson et al. | |
| 2005/0065977 A1 | 3/2005 | Benson et al. | |
| 2005/0125430 A1 | 6/2005 | Souder et al. | |
| 2005/0165731 A1* | 7/2005 | Funk | 707/1 |
| 2005/0209990 A1* | 9/2005 | Ordille et al. | 707/1 |
| 2005/0273759 A1 | 12/2005 | Lucassen et al. | |
| 2006/0004691 A1* | 1/2006 | Sifry | 707/1 |
| 2006/0069702 A1* | 3/2006 | Moeller et al. | 707/200 |
| 2006/0173873 A1 | 8/2006 | Prompt et al. | |
| 2006/0236344 A1 | 10/2006 | Brain et al. | |
| 2007/0050620 A1 | 3/2007 | Pham et al. | |

FOREIGN PATENT DOCUMENTS

| | | |
|---|---|---|
| EP | 1130511 A2 | 9/2001 |
| WO | WO 02/075539 | 9/2002 |
| WO | WO2005/024550 A2 | 3/2005 |
| WO | WO2005/024551 A3 | 3/2005 |
| WO | WO2005/024552 A2 | 3/2005 |
| WO | WO2005/024626 A1 | 3/2005 |
| WO | WO2005/024665 A1 | 3/2005 |
| WO | WO2005/024666 A3 | 3/2005 |
| WO | WO 2005/029363 | 3/2005 |

OTHER PUBLICATIONS

Andrews, T. et al., "Combining Language and Database Advances in an Object-Oriented Development Environment", *OOPSLA Proceedings*, Oct. 4-8, 1987, 430-440.

Beard, M.K., et al., "Multilevel and Graphical Views of Metadata", *Research and Technology Advances in Digital Libraries, IEEE*, 1998, 256-265.

Beitner, N.D. et al., "Multimedia Support and Authoring in Microcosm: An Extended Model", *Department of Electronics and Computer Science*, University of Southampton, 12 pages.

Berg, C., How Do I Create Persistent Java Objects? *Dr. Dobb's Journal*, 1997, 22(4), 98-101.

Bhattacharya, S. et al., "Coordinating Backup/Recovery and Data Consistency Between Database and File Systems", *International Conference on Management of Data and Symposium on Principles of Database Systems, Proceedings of the 2002 ACM SIGMOD International Conference on Management of Data*, 2002, 500-511.

Biliris, A., "The Performance of Three Database Storage Structures for Managing Large Objects", *ACM SIGMOD*, 1992, 276-285.

Booch, G. Benjamin/Cummings Publishing Co, "Object-Oriented Analysis and Design with Applications", 1994, 155, 156, 179-183.

Bracchi et al., "Binary Logical Associations in Data Modelling", *Modelling in Data Base Management Systems G.M. Nijssen*, (ed); North Holland Publishing Company: 1976, 125-147.

Buneman, P. et al., Inheritance and Persistence in Database Programming Languages, *ACM*, 1986, 4-15.

Chien, A.A., "Concurrent Aggregates (CA)—Design and Experience with a Concurrent Object—Oriented Language Based on Aggregates", *J. Parallel and Distributed Computing*, 1995, 25(2), 174-196.

Chryssostomidis, Chryssosiomos, et al. "Geometric Modeling Issues in Computer Aided Design of Marine Structures", *MTS Journal*, 22(2) pp. 15-33.

"Computervision Launches Design Automation Development Platform for Windows", *PR Newswire*, Financial News, Jan. 10, 1995.

D'Andrea, A. et al., "Unisql's Next-Generation Object-Relational Database Management System", *ACM SIGMOD Record*, Sep. 1996, 25(2), 70-76.

Darby, C., Object Serialization in Java 1.1. Making Objects Persistent, *WEB Techniques*, 1997, 2(9), 55, 58-59.

"Developer's Guide to Apple Data Detectors-For Version 1.0.2", © Apple Computer, Inc., 1997, 1-34.

Dietrich, Walter C., Jr., et al., "TGMS: An Object-Oriented System for Programming Geometry", *Software-Practice and Experience*, Oct. 1989, 19(10), 979-1013.

Dobashi, Y. et al, "Skylight for Interior Lighting Design", *Computer Graphics Forum*, 1994, 13(3), C85-C96.

Dorsch, J., "Accel Signs with IBM to Buy Altium PCB Unit ,"*EDA Licensing, Electronic New*, Jan.16, 1995, 2 pages.

Fegaras, Leonidas, "Optimizing Object Queries Using an Effective Calculus", *ACM Transactions on Database Systems*, Dec. 2000, 25(4), 457-516.

Findler, R.B. et al., Contract Soundness for Object-Oriented Languages, *ACM Conference on Object-Oriented Programming Systems, Languages and Applications, OOPSLA*, 2001, 15 pages.

Foley et al., Computer Graphics: Principles and Practices, Second Edition, Addison-Wesley Publishing Company, 1990, Ch. 5 and 9, pp. 201-283.

Friis, A.-Christensen, et al."Geographic Data Modeling: Requirements and Research Issues in Geographic Data Modeling," Nov. 2001, *Proceedings of the 9th ACM International Symposium on Advances in Geographic Information Systems*, 2-8.

Fuh, Y-C. et al, "Implementation of SQL3 Structured Types with Inheritance and Value Substitutability", *Digital Symposium Collection*, 2000, Abstract only, 2 pages, www.acm.org/sigmod/disc/p_implementationoyostw.htm.

Garret, J.H., Jr. et al, "An Object Oriented Environment for Representing Building Design and Construction Data", *Advanced Construction Technology Center*, Jun. 1989, Document No. 89-37-04, 1-34.

Godoy Simões, M. et al, "A RISC-Microcontroller Based Photovoltaic System for Illumination Applications", *APEC 2000. Fifteenth Annual IEEE Applied Power Electronics Conference and Exposition*, Feb. 6-10, 2000, 2, 1151-1156.

Goscinski, A. "Distributed Operating Systems The Logical Design", *Addison-Wesley*, 1991, 306-313.

Harrison, C.J. et al., "Structure Editors: User-Defined Type Values and Type Inference", *IEEE*, 2000, 241-247.

Haverlock, K., "Object Serialization, Java, and C++", *Dr. Dobb's Journal*, 1998, 23(8), 32, 34, 36-37.

Hay, David C, "Data Model Patterns: Convention of Thought", (Dorset House Publishing, New York, NY 1996, 47-67, 235-259.

Hernandez, M.A. et al, "The Merge/Purge Problem for Large Databases, International Conference on Management of Data and Symposium on Principles of Database Systems", *Proceedings of the 1995 ACM SIGMOD International Conference on Management of Data*, 1995, 127-138.

Hsiao, H.I. et al., "DLFM: A Transactional Resource Manager", *SIGMOD, Proceedings of the 2000 ACM SIGMOD International Conference on Management of Data*, 2000, 518-528.

Kaneko, K, et al, "Design of 3D CG Data Model of Move Animation Database System", *Advanced Database Research and Development*

Series, vol. 3, Proceedings of the Second Far-East Workshop On Future Database Systems, 1992, 364-372.

Kaneko, K. et al., Towards Dynamics Animation on Object-Oriented Animation Database System Move, *Advanced Database Research and Development Series*, vol. 4, *Database Systems for Advanced Applications* 1993, 3-10.

Katz, R.H., "Toward a Unified Framework for Version Modeling in Engineering Databases", *ACM Computing Surveys*, 1990, 22(4), 375-408.

Kawabe, S. et al, "A Framework for 3D Modeling Constraint-Based Description and Non-Manifold Geometric Modeling", *A Collection of Contributions based on Lectures Presented at the 2d Toyota Conference, Organization of Engineering Knowledge for Product Modelling in Computer Integrated Manufacturing*, Japan, Oct. 2-5, 1988, 325-357.

Kempfer, L., "CAD Jumps on Windows 3.1 Bandwagon", *Computer Aided Engineering*, 1993, 24-25.

Khan, L. et al, A Performance Evaluation of Storing XML Data in Relational Database Management Systems, *WIDM*, 2001, 31-38.

Khoshafian, S. et al, "Object Identify", *OOPSLA'86*, 1986, 21, 406-416.

Kiesling, R., "ODBC in UNIX Environments", *Dr. Dobb's Journal*, Dec. 2002, 27(12), 16-22.

King et al, "TriStarp- An Investigation into the Implementation and Exploitation of Binary Relational Storage Structures", *Proc. 8.sup.th BNCOD(British National Conference On Data Bases)*, pp. 64-84 (York 1990).

Krouse, J.K., "Geometric Models for CAD/CAM", *Machine Design*, Jul. 24, 1990, 99-105.

LeBlanc, Andrew R., et al, "Design Data Storage and Extraction Using Objects,"*Concurrent Engineering: Research and Applications*, 1993, 1, 31-38.

Leontiev, Y. et al, "On Type Systems for Object-Oriented Database Programming Languages", *ACM Computing Surveys*, Dec. 2002, 34(4), 409-449.

Lim, J.B. et al, "Transaction Processing in Mobile, Heterogeneous Database Systems", *IEEE Trans. on Knowledge and Data Engineering*, 2002,14(6), 1330-1346.

Mallet, S. et al., "Myrtle: A Set-Oriented Meta-Interpreter Driven by a Relational Trace for Deductive Databases Debugging", *Lecture Notes in Computer Science*, 1999, 1559, 328-330.

Mariani, J. A., Oggetto: "An Object Oriented Database Layered on a Triple Store", *The Computer Journal*, 1992, 35(2),108-118.

McMahon, L.E, "SED-A Non-Interactive Text Editor", Bell Laboratories, Aug. 15, 1978, 10 pages.

"Mechanical Design Software (Buyers Guide)", *Computer-Aided Engineering*, Dec. 1993, 12(12), 32-36.

Melton, J. et al, "SQL and Management of External Data", *SIGMOD Record*, Mar. 2001, 30(1), 70-77.

Mitchell, W.J., "The Logic of Architecture", *Massachusetts Institute of Technology*, 1990, 139-143.

Navathe, S.B., "Evolution of Data Modeling for Databases," *Communications of the ACM*, Sep. 1992, 35(9), 112-123.

Nelson, M. et al, "Generic Support for Caching and Disconnected Operation", *4th Workshop on Workstation Operating Systems*, Oct. 1993, 61-65.

Nijssen, G.M. et al., "Conceptual Schema and Relational Database Design, A Fact Oriented Approach", *Department of Computer Science, University of Queensland, Prentice Hall*, 10-33, 42-43, 48-51, 156-170.

Oracle 9i SQL Reference, Release 2 (9.2), Mar. 2002, 13-89 to 13-90.

Orenstein, J, et al, "Query Processing in the Object Store Database System", *ACM SIGMOD International Conference on Management of Data*, Jun. 1992, 21(2),403-412.

Ottogalli, F.G. et al., "Visualisation of Distributed Applications for Performance Debugging",*Lecture Notes in Computer Science*, Jan. 2001, 2074, 831-840.

Pachet, et al, "A Combinatorial Approach to Content-Based Music Selection", *Multimedia Computing and Systems*, Jun. 7, 1999, 457-462.

Papiani, M. et al, "A Distributed Scientific Data Archive Using the Web, XML and SQL/MED", *SIGMOD Record*, Sep. 1999, 28(3), 56-62.

Powell, M., "Object, References, Identifiers, and Equality White Paper", (Jul. 2, 1993), *OMG TC Document 93.7.5*, 1-24.

Prosise, J., "2-D Drafting: Why Pay More?", *PC Magazine: The Independent Guide to IBM-Standard Personal Computing*, 1993, 12(4), 255-289.

Ramsey, N. et al., "An Algebraic Approach to File Synchronization", *Software Engineering Notes, Association for Computing Machinery*, Sep. 2001, 26(5), 175-185, XP002295139.

Reiner, A. et al., "Benefits of X-based Three-Tier Client/Server Model with ESRI Applications", *Virtual Solutions*, 1995, 9 pages.

Read, III, B.C., "Developing the Next Generation Cockpit Display System", *IEEE Aerospace and Electronics Systems Magazine*, 1996, 11(10), 411-415.

Rouse, N. E., "CAD Pioneers are Still Trailblazing", *Machine Design*, Oct. 22, 1987, 59(25),117-122.

Roussopoulos, N. et al., "Using Semantic Networks for Data Base Management", *Proceedings of the 1st Supplemental VLDB Conference*, 1975, 144-172.

Santos, J.L.T. et al., "Computer Aided Mechanical Engineering Design Environment for Concurrent Design Process", *Proceedings of the 1993 ITEC Workshop on Concurrent Engineering*, May 4-6, 1993, Simulation in Concurrent Engineering, 71-83.

Seshadri, P., "Enhanced Abstract Data Types in Object-Relational Databases", *The VLDB Journal, The International Journal on Very Large Databases*, 1998, 7, 130-140.

Simon, A.R., *Strategic Database Technology: Management for the Year 2000*, 1995, pp. 6-9, 14-17, 55-57, Morgan Kaufmann Publishers.

Sreenath, N., "A Hybrid Computation Environment for Multibody Simulation", *Mathematics and Computers in Simulation*1992, 121-140.

Singhal, A. et al., "DDB: An Object Design Data Manager for VLSI CAD", *Association for Computer Machinery*, 1993, 467-470.

Stevens, T., "Value in 3-D", *Industry Week*, Jan. 8, 1995, 45-46.

Stonebraker, M., "The Case for Partial Indexes", SIGMOD Record, 1989, 18(4), 4-9.

Strickland, T.M., "Intersection of Relational and Object", *Proceedings of the AM/FM International Conference XVII*, Mar. 14-17, 1994, 69-75.

Sutherland, J. et al., "The Hybrid Object-Relational Architecture (HORA), An Integration of Object-Oriented and Relational Technology", *Applied Computing: States of the Art and Practice*, 1993, 326-333.

Suzuki, H. et al., "Geometric Modeling for Modeling Products", *Proceedings of the Third international Conference on Engineering Graphics and Descriptive Geometry*, Jul. 11-16, 1988, Vienna Austria, 2, 237-243.

Sreekanth, U. et al., "A Specification Environment for Configuring a Discrete-Part Manufacturing System Simulation Infrastructure", *International Conference on Systems, Man and Cybernetics*, Oct. 17-20, 1993, 1, 349-354.

Taylor, R.H. et al., "An Integrated Robot System Architecture", *Proceedings of the IEEE*, Jul. 1983, 71(7), 842-856.

Varlamis I. et al., "Bridging XML-Schema and Relational Databases. A System for generating and Manipulating Relational Databases using Valid XML Documents", *DocEng' Ol*, Nov. 9-10, 2001.

Wilcox, J., "Object Databases-Object Methods in Distributed Computing", *Dr. Dobbs Journal*, Nov. 1994, 19(13), 26-34.

Watanabe, S., "Knowledge Integration for Architectural Design", *Knowledge-Based Computer-Aided Architectural Design*, 1994, 123-146.

Waugh, A., "Specifying Metadata Standards for Metadata Tool Configuration", *Computer Networks and ISDN Systems*, 1998, 30, 23-32.

Wold, E. et al., "Content-Based Classification, Search, and Retrieval of Audio", *IEEE Multimedia, IEEE Computer Society*, 1996, 3, 27-36.

Yoshikawa, M. et al., "XRel: A Path-Based Approach to Storage and Retrieval of XML Documents Using Relational Databases", *ACM Transactional on Internet technology*, Aug. 2001, 1(1), 110-141.

Huang, Yun-Wu. et al., "Lightweight Version Vectors for Pervasive Computing Devices", *IEEE*, 2000, 43-48.

Mazzola Paluska, J. et al., "Footloose: A Case for Physical Eventual Consistency and Selective Conflict Resolution", *Proceedings of the 5th IEEE Workshop on Mobile Computing Systems and Applications*, 2003, 170-179.

"SyncML Sync Protocol", Dec. 7, 2000, Version 1.0, 60 pages, http://www.syncml.org/docs/syncml protocol v10 20001207.pdf.

"Using Value Objects," by the XDoclet Team, last published May 5, 2005, 1-9 http://xdoclet.sourceforge.net/xdoclet/valueobjects.html.

Barker, J., "Beginning Java Objects," Wrox Press Ltd., (no month available) 2000, pp. 1 and 94.

Berenson, H. "A Critique of ANSI SQL Isolation Levels", SIGMOD RECORD, Jun. 1995, 24(2), 10 pages.

Bernstein et al., "The Microsoft Repository," Proceedings of the 23rd VLDB Conference, (no month available) 1997, 10 pages, http://citeseer.ist.psu.edu/bernstein97microsoft.html.

Bernstein, P. et al., "Microsoft Repository Version 2 & The Open Information Model," Microsoft Paper pub. In Information Systems, (no month available) 1999, 22(4), 1-27.

Booch, Benjamin/Cummings Publishing Co, "Object-Oriented Analysis and Design with Applications", (no month available) 1994, 155, 156, 179-183.

Evans, H., "XORM," Mapping Layer, Beta Version, Jul. 10, 2003, 19 pages, downloaded at http://sourceforge.net/projects/xorm.

Fialli et al., "Java TM Architecture for XML Binding (JAXB) Specification," Sep. 12, 2002, Version 0.7, 1-178.

Friis-Christensen, "Requirements and Research Issues in Geographic Data Modeling," Proceedings of the 9th ACM International Symposium on Advances in Geographic Information Systems, Nov. 2001, 2-8.

Gordon, A.D. et al., "Typing a Multi-Language Intermediate Code," POPL '01, London, UK, Jan. 2001, 248-260.

Gray, J. et al., "The Dangers of replication and a Solution", SIGMOD, (no month available) 1996, 25(2), 173-182.

Greenwald, R. et al., "Oracle Essentials: Oracle 8 & Oracle 8i", MultiUser Concurrency, Oct. 1999, Ch. 7, 7 pages.

Guy, R.G. et al., "Implementation of the Ficus Replicated File System", Proceedings of the Summer USENIX Conference, Jun. 1990, 63-71.

Helal, S. et al., "A Three-tier Architecture for Ubiquitous Data Access", Computer Systems and Applications ACS/IEEE, Jun. 2001, 177-180.

Ingalls et al., "Back to the future: the story of squek, a practical smalltalk written in itself", SIGPLAN Not. 32, Oct. 10, 1997, 318-326.

Ip et al., "Complex Objects in Knowledge-Based Requirement Engineering", IEEE, (no month available) 1991, 8-15.

Kistler, J.J. et al., "Disconnected Operation in the Coda File System", ACM Transactions on Computer Systems, Feb. 1992, 10(1), 3-25.

Kistler, J.J. et al., "Increasing File System Availability through Second-Class Replication", IEEE, (no month available) 1990, 65-69.

Liebig et al., "A publish/Subscribe CORBA Persistent State Service Prototype", Middleware 2000 IFIP/ACM International Conference on Distributed Platforms, NY, NY, Apr. 2000, 25 pages.

Lublinsky, B., "Approaches to B2B Integration," EAI Journal, Feb. 2002, 1-10.

McClanahan, C.R., "Apache Struts API Documentation: Class Redirect Tag," Version 1.1.1.1, Mar. 11, 2003, 10 pages.

Modi, T., "Clean Up Your Wire Protocol with SOAP," Java World, Apr. 27, 2001, Part 2, 15 pages.

Plattner, C. et al., "Ganymed: Scalable Replication for Transactional Web Applications", IFIP International federation for Information Processing, (no month available) 2004, 155-174.

Prague et al., Access 97 Bible, IDG Books Worldwide, Jan. 20, 1997, pp. 3, 18, 675, 676, 688.

Rizzo, T., "Introduction to Using ADO 2.5 with Microsoft Exchange 2000," Microsoft Website, Nov. 2000, 11 pages.

Sandhu et al., "A secure kernelized architecture for multilevel object-oriented databases", IEEE, Computer Security Foundations Workshop IV, 1991. Proceedings, Jun. 18-20, 1991, 139-152.

Seshadri, P. et al., "SQLServer for Windows Ce-a Database Engine for Mobile and Embedded Platforms", Data Engineering, Proceedings of the 16th International Conference, IEEE Computer Society, Mar. 2000, 642-644.

Shapiro, M. et al., "Managing Databases with Binary Large Objects", IEEE, (no month available) 1999, 185-193.

Singer, J., "JVM versus CLR: A Comparative Study," PPPJ 2003, Kilkenny City, Ireland, Jun. 16-18, 2003, 167-169.

Soundarajan et al., Fifth International Conference on Software reuse ICSR, (no month available) 1998, 206-215.

Wang et al., paper on (OS) application programming interfaces (APIs), IEEE Communications Magazine, Oct. 2001, 102-113.

Costa & Blair, "Integrating meta-information management and reflection in middleware" Distributed Objects and Applications, Sep. 21-23, 2000 Antwerp, Belgium, Proceedings International Symposium on Distributed Objects and Applications (DOA) 2000, 133-143.

\* cited by examiner

Paremeter table
400

Initial parameter table entry
410(a)

FIG. 4(a)

CHANGE NOTIFICATION QUERY MULTIPLEXING

CROSS-REFERENCE

This application is related by subject matter to the inventions disclosed in the following commonly assigned applications: U.S. patent application Ser. No. 10/646,646, filed on Aug. 21, 2003 entitled "STORAGE PLATFORM FOR ORGANIZING, SEARCHING, AND SHARING DATA"; U.S. patent application Ser. No. 10/647,058, filed on Aug. 21, 2003, entitled "SYSTEMS AND METHODS FOR REPRESENTING UNITS OF INFORMATION MANAGEABLE BY A HARDWARE/SOFTWARE INTERFACE SYSTEM BUT INDEPENDENT OF PHYSICAL REPRESENTATION"; U.S. patent application Ser. No. 10/646,941, filed on Aug. 21, 2003, entitled "SYSTEMS AND METHODS FOR SEPARATING UNITS OF INFORMATION MANAGEABLE BY A HARDWARE/SOFTWARE INTERFACE SYSTEM FROM THEIR PHYSICAL ORGANIZATION"; U.S. patent application Ser. No. 10/646,940, filed on Aug. 21, 2003, entitled "SYSTEMS AND METHODS FOR THE IMPLEMENTATION OF A BASE SCHEMA FOR ORGANIZING UNITS OF INFORMATION MANAGEABLE BY A HARDWARE/SOFTWARE INTERFACE SYSTEM"; U.S. patent application Ser. No. 10/646,632, filed on Aug. 21, 2003, entitled "SYSTEMS AND METHODS FOR THE IMPLEMENTATION OF A CORE SCHEMA FOR PROVIDING A TOP-LEVEL STRUCTURE FOR ORGANIZING UNITS OF INFORMATION MANAGEABLE BY A HARDWARE/SOFTWARE INTERFACE SYSTEM"; U.S. patent application Ser. No. 10/646,645, filed on Aug. 21, 2003, entitled "SYSTEMS AND METHOD FOR REPRESENTING RELATIONSHIPS BETWEEN UNITS OF INFORMATION MANAGEABLE BY A HARDWARE/SOFTWARE INTERFACE SYSTEM"; U.S. patent application Ser. No. 10/646,575, filed on Aug. 21, 2003, entitled "SYSTEMS AND METHODS FOR INTERFACING APPLICATION PROGRAMS WITH AN ITEM-BASED STORAGE PLATFORM"; and U.S. patent application Ser. No. 10/646,580, filed on Aug. 21, 2003, entitled "SYSTEMS AND METHODS FOR DATA MODELING IN AN ITEM-BASED STORAGE PLATFORM".

FIELD OF THE INVENTION

The present invention relates generally to the field of information storage and retrieval, and, more particularly, to a storage platform providing change notifications regarding changes in stored information.

BACKGROUND OF THE INVENTION

In many computer systems, the storage and retrieval of information for and by computer applications is handled by one or more central storage systems. For example, one type of storage system commonly used in personal computers is a file-folder-and-directory-based system, also termed a "file system." Such file systems organize pluralities of files into hierarchies to create an abstraction of the physical organization of the storage medium used to store the files. Generally, such organization into a hierarchy occurs at the operating system level. The files stored generally include the file hierarchy itself (the "directory") embodied in a special file maintained by the file system. This directory, in turn, maintains a list of entries corresponding to all of the other files in the directory and the nodal location of such files in the hierarchy (herein referred to as the folders).

The use of file system for central storage has several limitations. These may be overcome by using relational database technology as the underpinning of a central storage system, as described in the patent in the patent applications referenced above in the "Cross-Reference" section.

In an application using data stored in a storage system, some activity of the application may be predicated on changes to the data stored in the storage system. For example, an email program may wish to know when a new email message arrives. In certain systems, email messages arrive and are stored on the storage system. When a new message arrives, the email program can then perform any internal processing using the fact that a new email message has arrived or using the content of the email message. For example, some email programs contain rules used to process messages. The application of these rules is triggered, in some cases, by the arrival of a new message. Additionally, there may be user interface changes based on changes to data stored in the storage system. For example, upon the arrival of a new message, an alert may be presented to the user which indicates that a new message has arrived. A list of messages may be refreshed to include the new message.

In view of the foregoing, there is a need for a change notifier that can be used in a database-based storage system and provides for good performance and scalability. The present invention satisfies this need.

SUMMARY OF THE INVENTION

The invention provides for the multiplexing of change notification requests through the issuing of a combined query. In one embodiment, the invention is a storage platform which includes a data store, a database engine which provides a way for interaction to occur with the data store, and an API that provides a way for application programs to issue change notification requests. At least two change notification requests are multiplexed and a combined query is used to query the data store (via a query to the database engine). A data structure, in one embodiment in the form of a table including query parameters, can be used to multiplex queries. The data structure stores the parameters for a change notification request and a query is issued which refers to the data structure to determine what changes are being tracked for notification. When a compatible second change notification request is received, the parameters for that second change notification request is added to the data structure. This alters the query without requiring the reissuing of the query to the database engine. Methods according to the invention can be implemented by instructions stored on a computer-readable medium Other features and advantages of the invention may become apparent from the following detailed description of the invention and accompanying drawings.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary embodiments of various aspects of the invention; however, the invention is not limited to the specific methods and instrumentalities disclosed. In the drawings:

FIGS. 4(a)-4(c) are block diagrams illustrating a parameter table according to one embodiment of the present invention;

DETAILED DESCRIPTION OF ILLUSTRATIVE EMBODIMENTS

A. Exemplary Computing Environment

Figure 1:
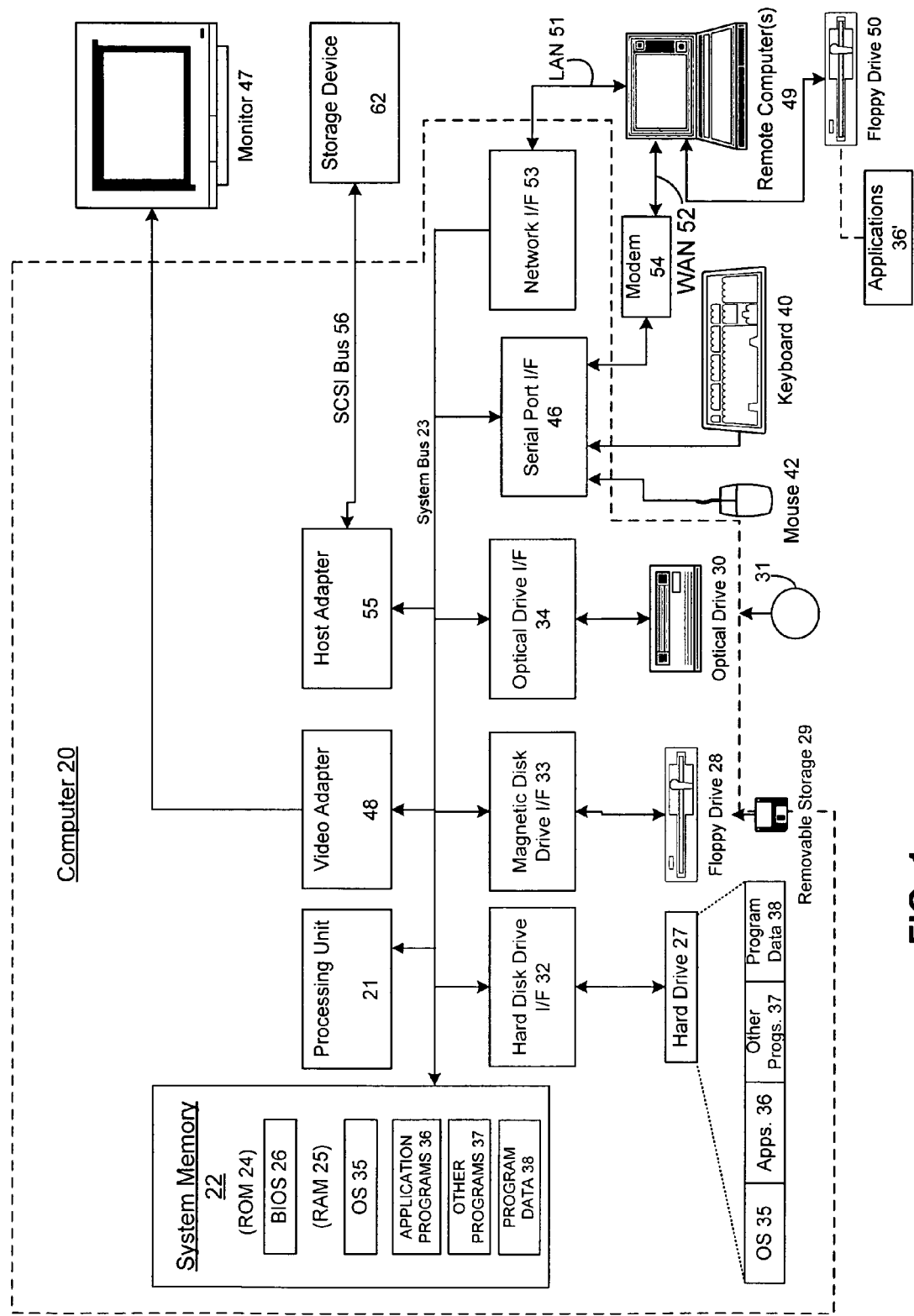
FIG. 1 is a block diagram representing a computer system in which aspects of the present invention may be incorporated.

Numerous embodiments of the present invention may execute on a computer. FIG. 1 and the following discussion are intended to provide a brief general description of a suitable computing environment in which the invention may be implemented. Although not required, various aspects of the invention may be described in the general context of computer executable instructions, such as program modules, being executed by a computer, such as a client workstation or a server. Generally, program modules include routines, programs, objects, components, data structures and the like that perform particular tasks or implement particular abstract data types. Moreover, the invention may be practiced with other computer system configurations, including hand held devices, multi processor systems, microprocessor based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment. Likewise, the exemplary environment may also include many types of monitoring devices such as heat sensors and security or fire alarm systems, and other sources of information.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
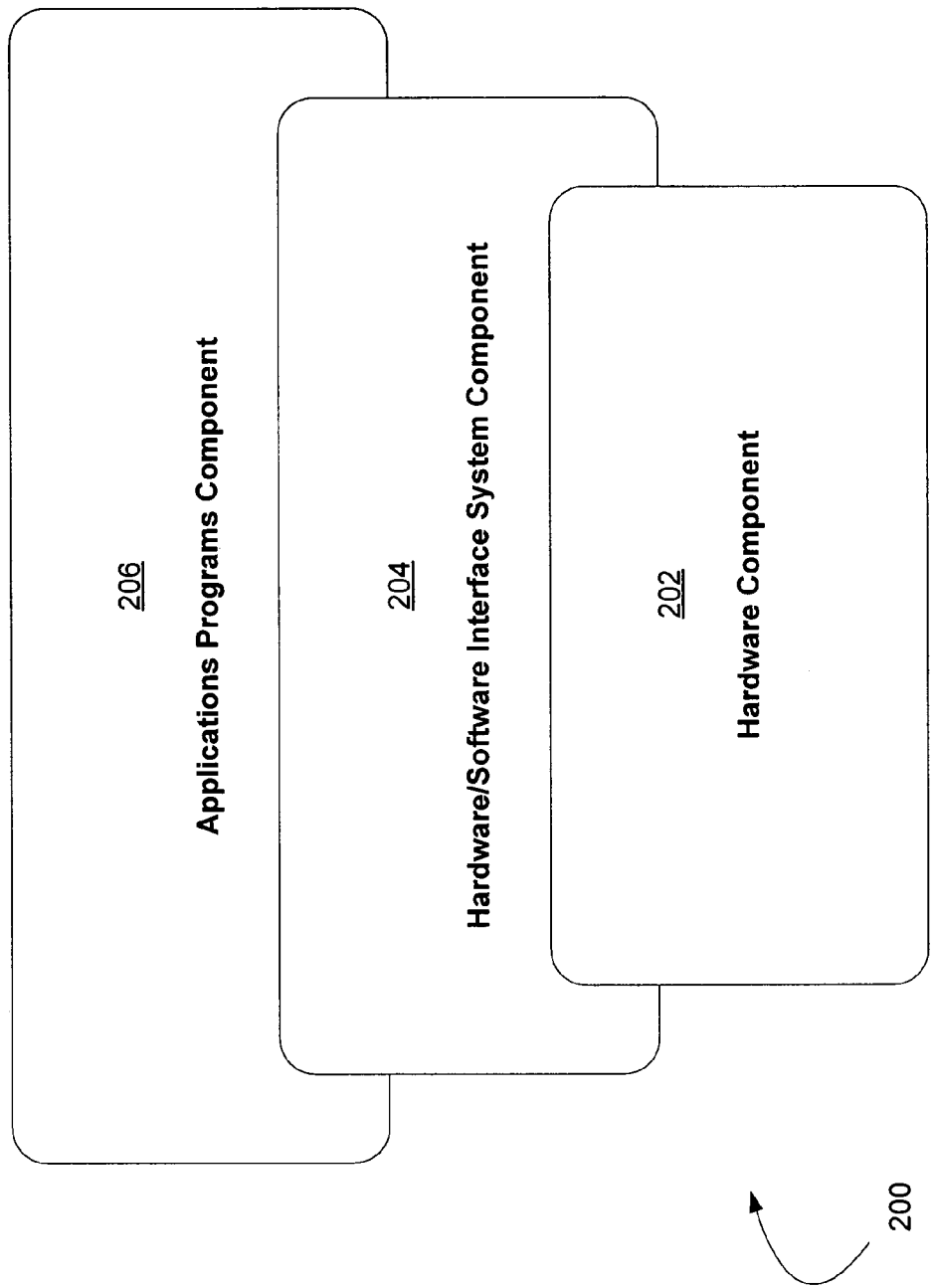
FIG. 2 is a block diagram illustrating a computer system divided into three component groups: the hardware component, the hardware/software interface system component, and the application programs component.

As illustrated in the block diagram of FIG. 2, a computer system 200 can be roughly divided into three component groups: the hardware component 202, the hardware/software interface system component 204, and the applications programs component 206 (also referred to as the "user component" or "software component" in certain contexts herein).

In various embodiments of a computer system 200, and referring back to FIG. 1, the hardware component 202 may comprise the central processing unit (CPU) 21, the memory (both ROM 24 and RAM 25), the basic input/output system (BIOS) 26, and various input/output (I/O) devices such as a keyboard 40, a mouse 42, a monitor 47, and/or a printer (not shown), among other things. The hardware component 202 comprises the basic physical infrastructure for the computer system 200.

The applications programs component 206 comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users).

The hardware/software interface system component 204 comprises (and, in some embodiments, may solely consist of) an operating system that itself comprises, in most cases, a shell and a kernel. An "operating system" (OS) is a special program that acts as an intermediary between application programs and computer hardware. The hardware/software interface system component 204 may also comprise a virtual machine manager (VMM), a Common Language Runtime (CLR) or its functional equivalent, a Java Virtual Machine (JVM) or its functional equivalent, or other such software components in the place of or in addition to the operating system in a computer system. The purpose of a hardware/software interface system is to provide an environment in which a user can execute application programs. The goal of any hardware/software interface system is to make the computer system convenient to use, as well as utilize the computer hardware in an efficient manner.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (simply referred to herein as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

While it is envisioned that numerous embodiments of the present invention are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

B. Change Data Notification

As discussed above, it is useful, for some applications, to have a notification of a change to data stored in the storage system. In at least one storage system using relational database technology, Microsoft Corp.'s WinFS, such notifications are handled by a notification service. In WinFS, an application programming interface (API) allows for such notification requests in WinFS. WinFS API watchers are a set of classes that allow applications to be selectively notified of changes in the WinFS store and provide state information that can be persisted by the application to support suspend/resume scenarios. Through the API an application can create a watcher to watch for specific changes in the storage system. When the change occurs, the watcher raises an event and sends data regarding the change.

A watcher watches for specified changes in the data. In WinFS, data to be stored in the storage system is stored as items. Each item has an associated type. The type of the item is a schema which defines the structure of and properties for the item. In addition, the storage system stores associations between items, known as relationships. An extension can also be associated with an item. Extensions are used to extend a type. An application defines an extension to an item type. For an example, for the "person" type, the schema used by the storage system defines first name, last name, and birth date, etc. as the fields of an item of this type. However, no field for eye color data exists in the person type. If one is needed, then an application can extend the person type by defining an eye color extension. When such an extension is in place, eye color data can be stored in this extension as part of an item of type person.

The watcher class can notify your application of changes to different aspects of WinFS objects, including the following:
Item changes
Item extension changes
Relationship changes Watchers can act on complicated items. For example, where an item is a hierarchy of other items, the watcher can watch the item and the items in the hierarchy for any changes.

Event data is returned when a watcher raises an event (because it is determined that the change for which notification was requested has occurred). This event data includes data which allows the requesting entity to understand what has occurred, e.g., the identity of the item changed, the type of change (add, modify, delete), etc.

When a watcher raises an event, it sends watcher state data with the event notification. The application can store this state data for later retrieval. Subsequently, the watcher state data can be used to request notification of events for all changes that occurred after the state was generated.

The watcher APIs can be implemented using a command which waits for a result from a query or for a timeout. One such command in the SQL language is "waitfor." Thus, a watcher which is being requested to look for a change to a certain item ItemToBeWatched might use a query Q(ItemToBeWatched) which only returns when and if a change in ItemToBeWatched occurs, and the watcher would implement a command analogous to the following pseudocode command:

waitfor (Q(ItemToBeWatched))

Appendix A includes actual SQL code which can implement the such a query. The SQL code in Appendix A includes a waitfor query which waits for any item changes to occur in a folder item (folderId). The first portion ("SELECT 1 . . . ") is a query which returns when an item is added to the folder. The second portion ("SELECT 2 . . . ") is a query which returns when an item in the folder is modified. The third portion ("SELECT 3 . . . ") is a query which returns when an item in the folder is deleted.

Thus, change notifications may be accomplished for an application. However, there may be many changes in the data stored in the storage system which are of interest to an application, and so an application may create many watchers to watch different kind of changes. Knowledge about changes in various items, extensions, and relationships may require the use of many change notifiers. However, such queries issued against the database which is at the core of the storage system places a high load on the database server. This high load may cause decreased performance of the storage system by using CPU time and memory. Additionally, scalability is adversely affected; even if a storage system can adequately handle having a number of watchers, it may be impossible to scale up the system.

C. Multiplexing Requests

Figure 3:
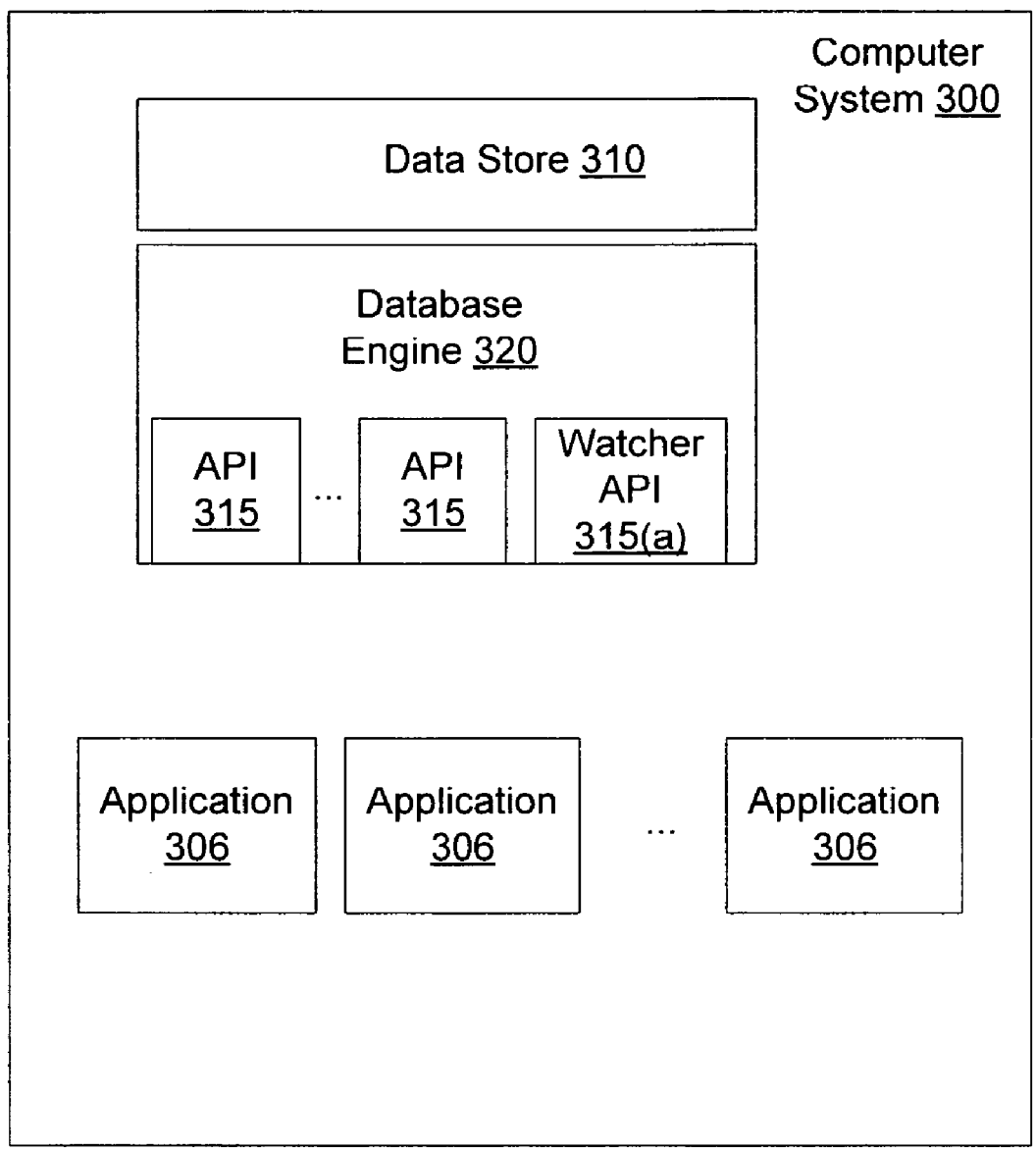
FIG. 3 is a block diagram of a computer system according to one embodiment of the invention.

FIG. 3 is a block diagram of a computer system according to one embodiment of the invention. As shown in FIG. 3, in one embodiment, a data store 310 is implemented on a database engine 320. The data store 310 stores data. In one embodiment, the data store is a relational database. The database engine 320 controls the storage of data in the data store 310. The database engine 320 also accepts queries for data stored in the data store 310, evaluates the queries, and returns data from the data store 310 in response. One such data store 310 and data engine 320 is available from Microsoft Corporation in SQL database products.

The data store 310 and data engine 320 are used as a central storage system for computer system 300. The data store 310 provides the storage for the computer system 300, the database engine 320, among other tasks, provides storage functionality for application programs 306. One way in which functionality is provided by the database engine 320 for application programs 306 is by exposing application programs interfaces (APIs) 315. One of these APIs 315 is watcher API 315(a). The watcher API 315(a) allows a watcher to be requested by an application program 306. The application program 306 can request a watcher in order to request notification whenever a specific change occurs to data in the data store 310. For example, an application program 306 may request to be notified when a document is modified. In the case where data store 310 supports folder trees with a hierarchy that arranges documents under the folder tree, an application program 306 may specify a folder tree, and request notification when any document is modified under that folder tree.

The watcher API 315(a) queries to the database engine 320. The query returns only when the specified change occurs. In one embodiment, the watcher notifies the requesting application only that the change has occurred. In another embodiment, the watcher includes in the change notification to the requesting application program 306 information about the type of change that has occurred. In some embodiments, if no changes occur within a timeout period, the change notification request expires. In one such an embodiment, expiration is not reported to the requesting application program 306. Watcher API 315(a) just resubmits the query request after a query expires. The expiration is, in one embodiment, reported to the requesting application program 306.

Figure 4B:
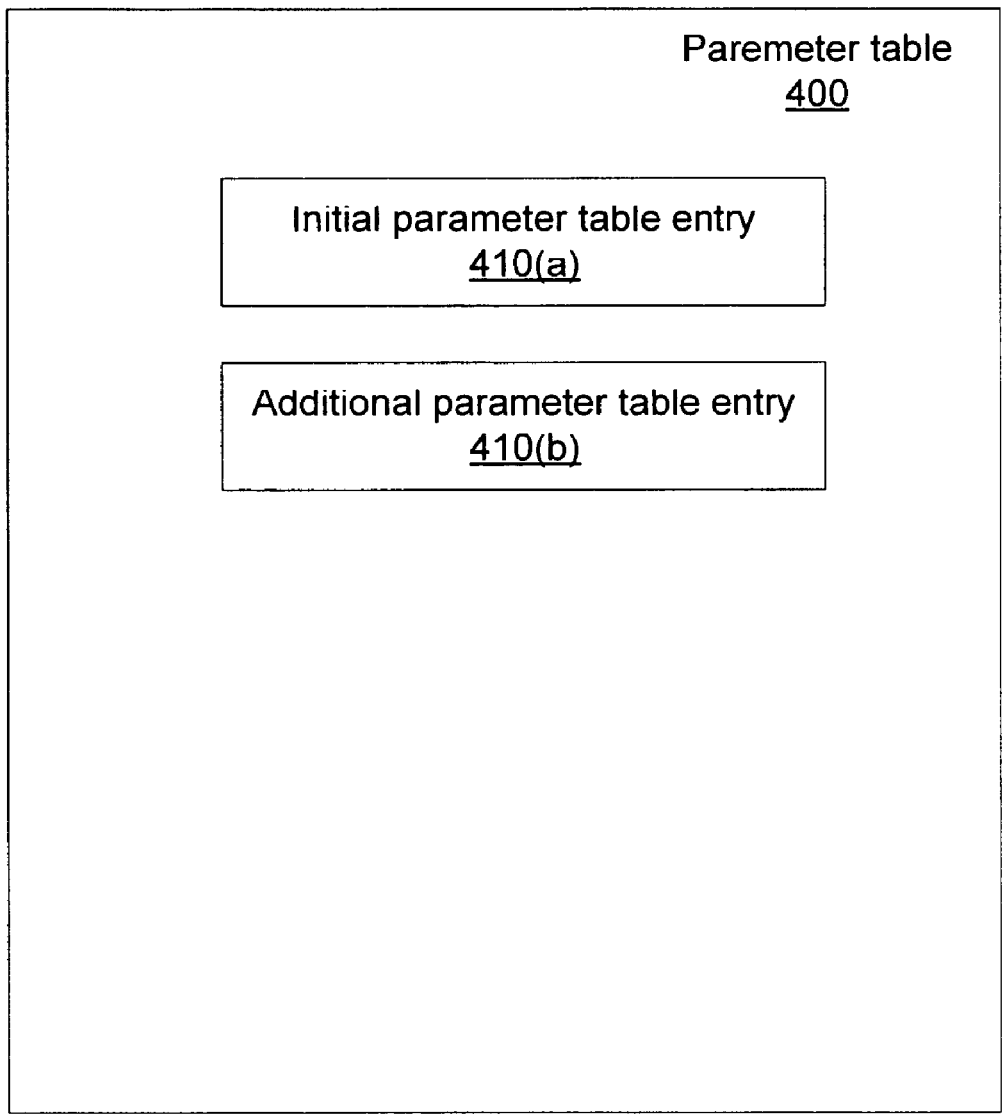
Figure 4C:
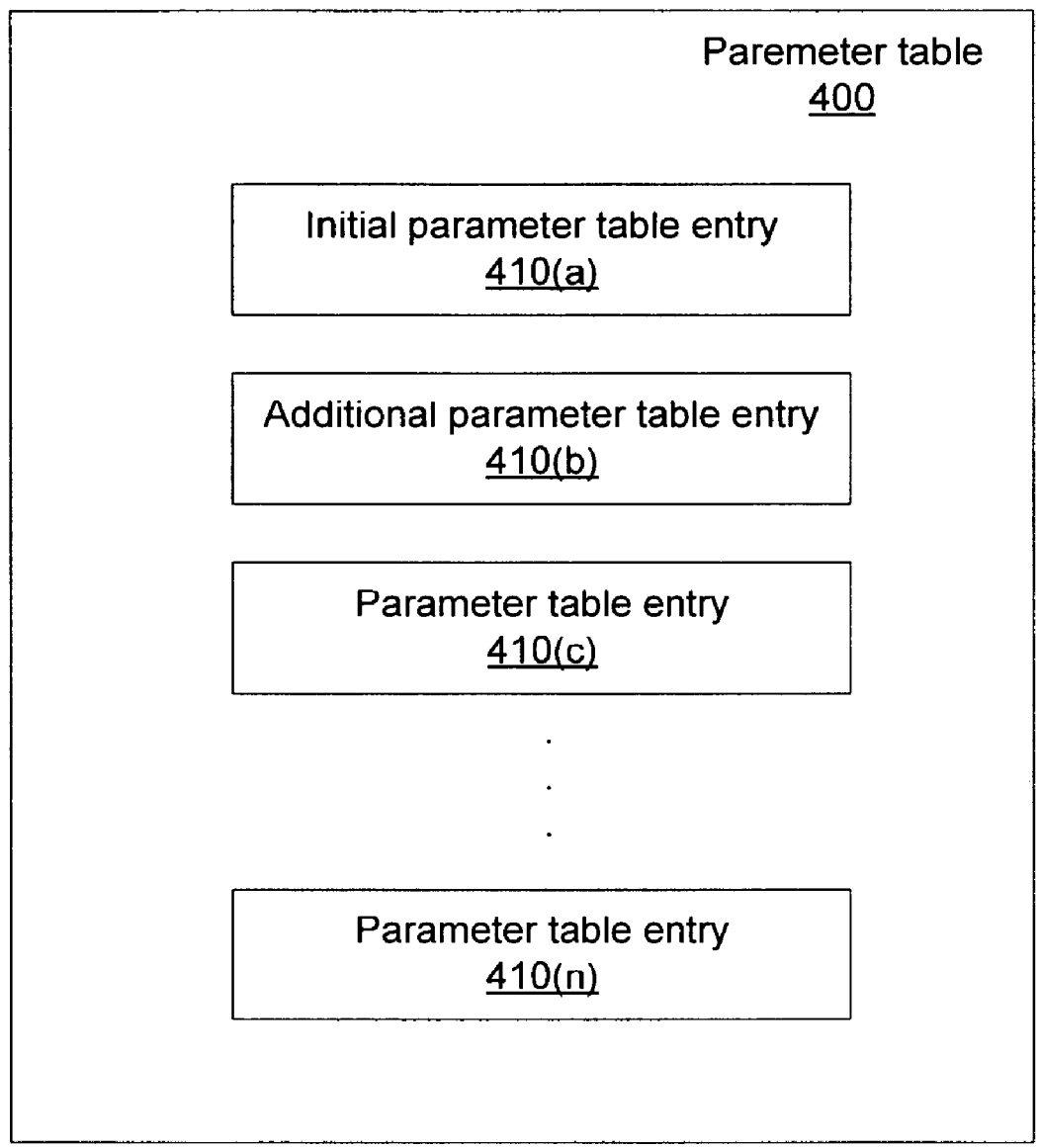

In order to provide the advantages of the present invention, some change notification requests are multiplexed. In one embodiment, two or more change notification requests handled by the watcher API 315(a) are multiplexed by storing the information regarding the object of the requests in a data structure. FIGS. 4(a)-4(c) are block diagrams illustrating such a data structure, parameter table 400, according to one embodiment of the present invention. In FIGS. 4(a)-4(c) each entry 410 on the parameter table 400 includes identifying information regarding one change request. Instead of each change notification request resulting in a separate query to the database engine 320, queries can be multiplexed by means of the parameter table 400. FIG. 4(a) illustrates the parameter table 400 after a one change notification request has been received. The first change notification request results in the creation of the parameter table 400 with one initial parameter table entry 410(a) which includes information regarding the change request. A query is then issued which requests that the database engine 320 provide notification of any changes described in any entries 410 of the parameter table 400.

Through the parameter table 400, additional change requests can thus be multiplexed without reissuing the query. FIG. 4(b) illustrates parameter table 400 after two change notification requests have been received and multiplexed. As shown in FIG. 4(b), when an additional change request is received, it is be multiplexed by inserting an additional entry 410(b) into the parameter table 400 which describes the change for which notification has been requested by the additional change request. The query which has been issued to the database engine 320 is unchanged. In FIG. 4(c), which illustrates parameter table 400 after more than two change notification requests have been received, additional entries 410(c) through 410(n) have been inserted into the parameter table 400.

In SQL Server or other relational database systems, tables can be created as a temporary table or a regular table. In one embodiment, the data structure is a temporary table; in another, it is a regular table.

In one embodiment, complex change requests can be described in more than one entry 410 into parameter table 400. In this embodiment, a change request may be associated with more than one entry 410 into the parameter table 400.

An entry 410 into the parameter table will contain information necessary to determine what changes the change notification request is directed towards. This includes information about which items in the data store 310 to watch. Additionally, in various embodiments, the entries 410 may include some or all of:

identification information for the change notification request (watcher id)

identification information for the database connection session (session id)

lower water mark (a time stamp indicating a certain time, changes occurring will only be responsive to the change notification request if they occurred after the lower water mark time); and an indication of whether updates, additions, and/or deletions are changes relevant to the change notification request.

The requesters of each change notification request are tracked. When the query returns a result indicating a change responsive to one or more change notification requests, the appropriate requestor(s) are notified of the change that has occurred.

Figure 5:
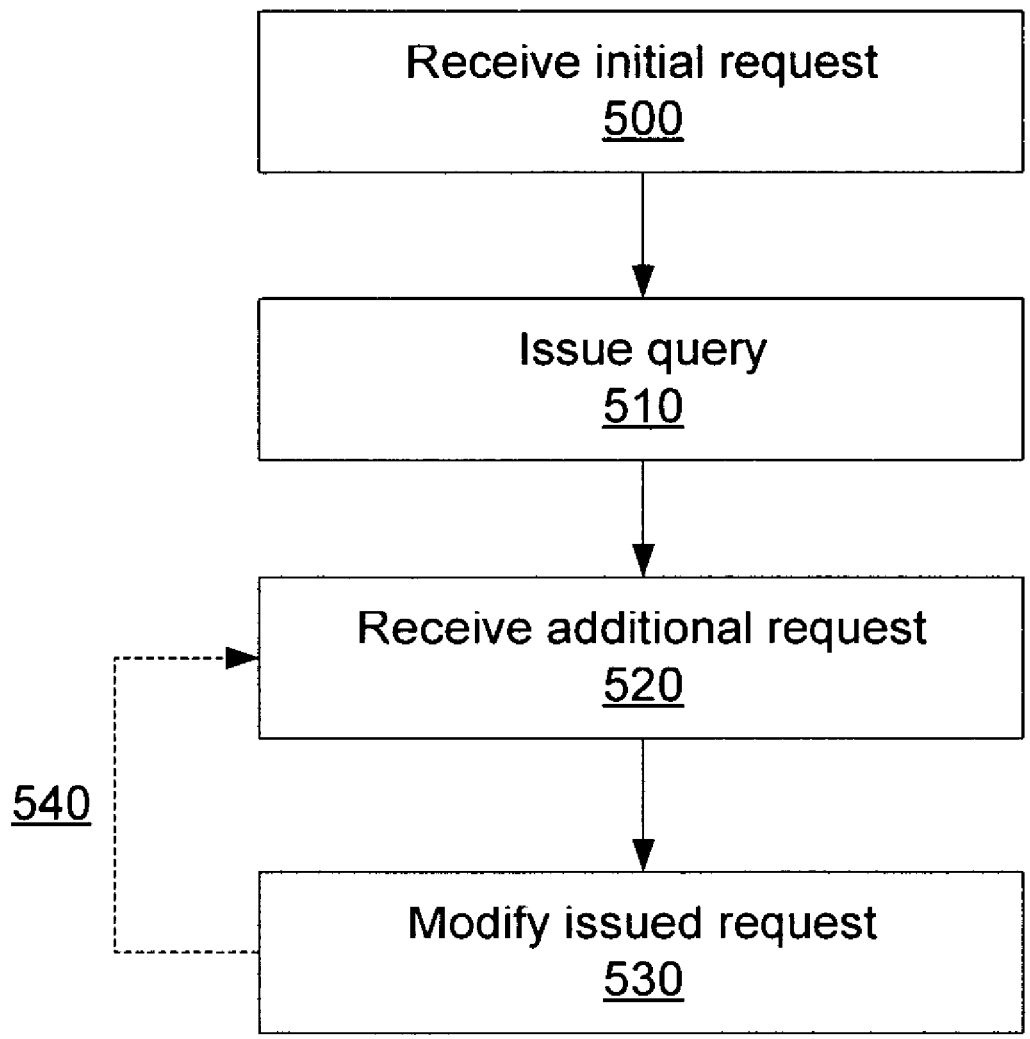
FIG. 5 is a flow diagram depicting a method of handling multiple change notification requests according to one embodiment of the invention.

FIG. 5 is a flow diagram depicting a method of handling multiple change notification requests according to one embodiment of the invention. As seen in FIG. 5, an initial change notification request is received 500. In one embodiment, the initial change request is received when a requesting application program 306 invokes a method of an application programming interface (API). As a result of said initial change notification request, at step 510, a query is issued to the database engine 320. This query will return if the change (or one of the changes) indicated in the initial change request has occurred.

At some point following step 500, an additional change notification request is received, step 520. At step 530, the already-issued query is altered. This alteration allows the query to serve both the initial change notification request and the additional change notification requests by returning to indicate a change if any change specified in the initial change request or the additional change request occurs. Further change notification requests may be received and added to the query, as indicated by dashed arrow 540.

While the query is altered in step 530, this alteration does not require resubmission of the query. In one embodiment, the parameter table is modified by inserting rows corresponding to the new request. Because the query includes a reference to the parameter table, as a net result, the existing query will also return changes for the new request.

In one embodiment, the query includes a reference to a data structure such as parameter table 410. Step 530 may, in one such embodiment, be accomplished solely by adding data from the additional change notification request to the data structure. In an alternate embodiment, step 530 may be accomplished by adding data to the change notification request in addition to other actions.

Figure 6:
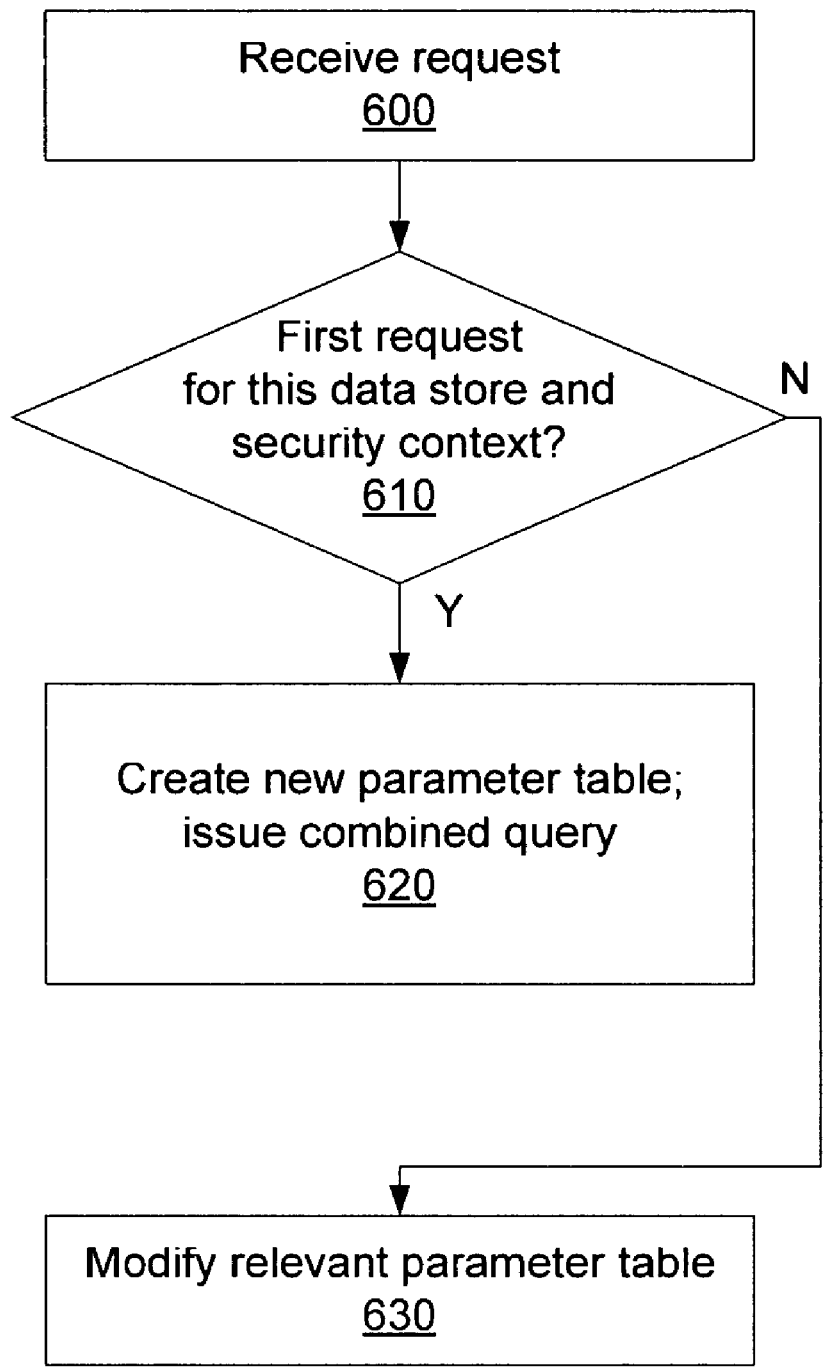
FIG. 6 is a flow diagram of a method of handling a change notification request according to one embodiment of the invention.

FIG. 6 is a flow diagram of a method of handling a change notification request according to an embodiment of the invention in which multiple data stores exist to which change notifications may be directed, and in which each application or requesting entity has a security context, and in which only requests from entities with the same security context should be multiplexed. As seen in FIG. 6, when a change notification request is received, 600, an examination is made to determine whether a previous request has been made for a change notification to the same store and with the same security context 610. If it has not been, then a new parameter table is created, and a new query is issued, 620. If it has been, then the relevant parameter table is modified 630.

In one embodiment, where the requests are issued by application programs 306 by calling a method of an API, requests are each assigned a request id. When the query returns and indicates that a specific change has occurred, the requests are examined to determine which request or requests the change is responsive to. The information returned by the query is then communicated to the relevant requesting entities by using a callback function provided by the requesting entity in its request.

In one embodiment of the invention, in order to efficiently find rows in the data store 510 which are relevant to a change request, as part of the query, a database index on (session id, watcher id) is created on the parameter table 410. Further, in order to distinguish between evens for different change requests, the watcher id is returned as part of the query result. The results are sorted by watcher id and timestamp. Thus, events for a given change request are consecutive to each other in the result. Appendix B provides a source code listing of the query which implements the multiplexing of requests, in accordance with one embodiment of the present invention. In the store relevant to Appendix B, the data store includes items, extensions, and relationships. In Appendix B, there are nine SELECT queries inside a WAITFOR query. These select statements find change for, in order, monitoring to see if any of the following events have happened which are responsive to a change request: item additions, item modifications, item deletions, extension additions, extension modifications, extension deletions, relationship additions, relationship modifications, and relationship deletions.

D. Conclusion

As the foregoing illustrates, the present invention is directed to a storage platform for organizing, searching, and sharing data. The storage platform of the present invention extends and broadens the concept of data storage beyond existing file systems and database systems, and is designed to be the store for all types of data, including structured, non-structured, or semi-structured data, such as relational (tabular) data, XML, and a new form of data called Items. Through its common storage foundation and schematized data, the storage platform of the present invention enables more efficient application development for consumers, knowledge workers and enterprises. It offers a rich and extensible application programming interface that not only makes available the capabilities inherent in its data model, but also embraces and extends existing file system and database access methods. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

As is apparent from the above, all or portions of the various systems, methods, and aspects of the present invention may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

APPENDIX A

```
Waitfor(
    (SELECT 1 as eventType, t.TargetItemId, t.__CreationLocalTS
    as timeStamp, CONVERT(bigint, min__active__rowversion( )) as
    lwm, t.__PathHandle
    [System.Storage.Store].[Tombstone!ItemsInDomain](@folderId)
t
    WHERE
        (@ItemType IS NULL) OR
        ([System.Storage.Store].[IsOfItemType](t.TargetItemId,
        @ItemType) = 1)) AND
        t.__TombstoneStatus = 0 AND
        t.__CreationLocalTS >= @LowWatermark AND
        t.__CreationLocalTS not IN
        (select ts From
        tempdb.dbo.[System.Storage.Watcher.Duplicates] d
        WHERE d.SessionId = @SqlSessionId AND d.ItemId =
        t.TargetItemId AND d.ExtOrRelId = '00000000-0000-
        0000-0000-000000000000')
    UNION ALL
    SELECT 2 as eventType, t.TargetItemId,
    i.__ChangeTrackingInfo.LastUpdateLocalTS as timeStamp,
    CONVERT(bigint, min__active__rowversion( )) as lwm,
    t.__PathHandle
    [System.Storage.Store].[Tombstone!ItemsInDomain](@folderId)
t
    INNER JOIN [System.Storage.Store].[Master!Item] i ON
t.TargetItemId = i.ItemId
    WHERE
        (((@ItemType IS NULL) OR
        ([System.Storage.Store].[IsOfItemType](t.TargetItemId,
        @ItemType) = 1)) AND
        i.__ChangeTrackingInfo.LastUpdateLocalTS >=
        @LowWatermark AND
        i.__ChangeTrackingInfo.LastUpdateLocalTS >
        i.__ChangeTrackingInfo.CreationLocalTS AND
        i.__ChangeTrackingInfo.LastUpdateLocalTS NOT IN
            (select ts From
            tempdb.dbo.[System.Storage.Watcher.Duplicates] d
            WHERE d.SessionId = @SqlSessionId AND d.ItemId =
            i.ItemId AND d.ExtOrRelId = '00000000-0000-0000-
            0000-000000000000')
    UNION ALL
    SELECT 3 as eventType, t.TargetItemId,
    t.__LastUpdateLocalTS as timeStamp, CONVERT(bigint,
    min__active__rowversion( )) as lwm, t.__PathHandle
    FROM
    [System.Storage.Store].[Tombstone!ItemsInDomain](@folderId)
t
    WHERE
        (((@ItemType IS NULL) OR
        ([System.Storage.Store].[IsOfItemType](t.TargetItemId,
        @ItemType) = 1)) AND
        t.__LastUpdateLocalTS>= @LowWatermark AND
        t.__TombstoneStatus <> 0 AND
        t.__LastUpdateLocalTS not IN
        (select ts From
        tempdb.dbo.[System.Storage.Watcher.Duplicates] d WHERE
        d.SessionId = @SqlSessionId AND d.ItemId = t.TargetItemId
        AND d.ExtOrRelId = '00000000-0000-0000-0000-000000000000')
    )ORDER BY timeStamp ASC
), timeout 30000
```

APPENDIX B

```
WAITFOR(( SELECT w.WatcherId, 1 as eventType, t.TargetItemId,
NULL, t.__CreationLocalTS as timeStamp, CONVERT(bigint,
min__active__rowversion( )) as lwm, t.__PathHandle
  FROM tempdb.dbo.[System.Storage.Watcher.Parameters] w CROSS
APPLY
[System.Storage.Store].[Tombstone!ItemsInDomain](w.DomainRoot) t
WHERE
w.SessionId = @SqlSessionId AND
w.WatchAdd = 1 AND
w.WatcherDepth = 3 AND
(w.WatchItem = 1) AND ((w.ItemType IS NULL) OR
([System.Storage.Store].[IsOfItemType](t.TargetItemId,
```

APPENDIX B-continued

```
w.ItemType) = 1)) AND
t.__TombstoneStatus = 0 AND
t.__CreationLocalTS >= w.LowWatermark AND
t.__CreationLocalTS not IN
(select ts From tempdb.dbo.[System.Storage.Watcher.Duplicates]
d WHERE d.SessionId = @SqlSessionId AND WatcherId = w.WatcherId
AND d.ItemId = t.TargetItemId AND d.ExtOrRelId = '00000000-
0000-0000-0000-000000000000')
UNION ALL
SELECT w.WatcherId, 2 as eventType, t.TargetItemId, NULL,
i.__ChangeTrackingInfo.LastUpdateLocalTS as timeStamp,
CONVERT(bigint, min__active__rowversion( )) as lwm, t.__PathHandle
FROM tempdb.dbo.[System.Storage.Watcher.Parameters] w CROSS
APPLY
[System.Storage.Store].[Tombstone!ItemsInDomain](w.DomainRoot) t
INNER JOIN [System.Storage.Store].[Master!Item] i ON
t.TargetItemId = i.ItemId
WHERE
w.SessionId = @SqlSessionId AND
w.WatchUpdate = 1 AND
w.WatcherDepth = 3 AND
(w.WatchItem = 1) AND ((w.ItemType IS NULL) OR
([System.Storage.Store].[IsOfItemType](t.TargetItemId,
w.ItemType) = 1)) AND
i.__ChangeTrackingInfo.LastUpdateLocalTS >= w.LowWatermark AND
i.__ChangeTrackingInfo.LastUpdateLocalTS >
i.__ChangeTrackingInfo.CreationLocalTS AND
i.__ChangeTrackingInfo.LastUpdateLocalTS NOT IN
(select ts From tempdb.dbo.[System.Storage.Watcher.Duplicates]
d WHERE d.SessionId = @SqlSessionId AND WatcherId = w.WatcherId
AND d.ItemId = i.ItemId AND d.ExtOrRelId = '00000000-0000-0000-
0000-000000000000')
UNION ALL
  SELECT w.WatcherId, 3 as eventType, t.TargetItemId, NULL,
t.__LastUpdateLocalTS as timeStamp, CONVERT(bigint,
min__active__rowversion( )) as lwm, t.__PathHandle
FROM tempdb.dbo.[System.Storage.Watcher.Parameters] w CROSS
APPLY
[System.Storage.Store].[Tombstone!ItemsInDomain](w.DomainRoot) t
WHERE
w.SessionId = @SqlSessionId AND
w.WatchDelete = 1 AND
w.WatcherDepth = 3 AND
(w.WatchItem = 1) AND ((w.ItemType IS NULL) OR
([System.Storage.Store].[IsOfItemType](t.TargetItemId,
w.ItemType) = 1)) AND
t.__LastUpdateLocalTS>= w.LowWatermark AND
t.__TombstoneStatus <> 0 AND
t.__LastUpdateLocalTS not IN
(select ts From tempdb.dbo.[System.Storage.Watcher.Duplicates]
d WHERE d.SessionId = @SqlSessionId AND WatcherId = w.WatcherId
AND d.ItemId = t.TargetItemId AND d.ExtOrRelId = '00000000-
0000-0000-0000-000000000000')
  UNION ALL
  SELECT w.WatcherId, 4 as eventType, e.ItemId, e.TypeFamilyId,
  e.__ChangeTrackingInfo.CreationLocalTS as timeStamp,
  CONVERT(bigint, min__active__rowversion( )) as lwm, t.__PathHandle
FROM tempdb.dbo.[System.Storage.Watcher.Parameters] w CROSS
APPLY
[System.Storage.Store].[Tombstone!ItemsInDomain](w.DomainRoot) t
INNER JOIN [System.Storage.Store].[Master!Extension] e ON
t.TargetItemId = e.ItemId
WHERE w.SessionId = @SqlSessionId AND w.WatchAdd = 1 AND
w.WatcherDepth = 3 AND
(w.WatchExtension = 1) AND ((w.ExtensionType IS NULL) OR
([System.Storage.Store].[IsOfExtensionType](e.ItemId,
e.TypeFamilyId, w.ExtensionType) = 1)) AND
e.__ChangeTrackingInfo.CreationLocalTS >= w.LowWatermark AND
e.__ChangeTrackingInfo.CreationLocalTS not IN
(select ts From tempdb.dbo.[System.Storage.Watcher.Duplicates]
d WHERE d.SessionId = @SqlSessionId AND WatcherId = w.WatcherId
AND d.ItemId = e.ItemId AND d.ExtOrRelId = e.TypeFamilyId)
UNION ALL
SELECT w.WatcherId, 5 as eventType, e.ItemId, e.TypeFamilyId,
e.__ChangeTrackingInfo.LastUpdateLocalTS as timeStamp,
CONVERT(bigint, min__active__rowversion( )) as lwm, t.__PathHandle
FROM tempdb.dbo.[System.Storage.Watcher.Parameters] w CROSS
APPLY
[System.Storage.Store].[Tombstone!ItemsInDomain](w.DomainRoot) t
```

APPENDIX B-continued

```
INNER JOIN [System.Storage.Store].[Master!Extension] e ON
t.TargetItemId = e.ItemId
WHERE
w.SessionId = @SqlSessionId AND
w.WatchUpdate = 1 AND
w.WatcherDepth = 3 AND
(w.WatchExtension = 1) AND ((w.ExtensionType IS NULL) OR
([System.Storage.Store].[IsOfExtensionType](e. ItemId,
e.TypeFamilyId, w.ExtensionType) = 1)) AND
e._ChangeTrackingInfo.LastUpdateLocalTS >= w.LowWatermark AND
e._ChangeTrackingInfo.LastUpdateLocalTS >
e._ChangeTrackingInfo.CreationLocalTS AND
e._ChangeTrackingInfo.LastUpdateLocalTS not IN
(select ts From tempdb.dbo.[System.Storage.Watcher.Duplicates]
d WHERE d.SessionId = @SqlSessionId AND WatcherId = w.WatcherId
AND d.ItemId = e.ItemId AND d.ExtOrRelId = e.TypeFamilyId)
UNION ALL
SELECT w.WatcherId, 6 as eventType, e.ItemId, e.TypeFamilyId,
e._ChangeTrackingInfo.LastUpdateLocalTS as timeStamp,
CONVERT(bigint, min_active_rowversion( )) as lwm, t._PathHandle
FROM tempdb.dbo.[System.Storage.Watcher.Parameters] w CROSS
APPLY
[System.Storage.Store].[Tombstone!ItemsInDomain](w.DomainRoot) t
INNER JOIN [System.Storage.Store].[Tombstone!Extension] e ON
t.TargetItemId = e.ItemId
WHERE
w.SessionId = @SqlSessionId AND
w.WatchDelete = 1 AND
w.WatcherDepth = 3 AND
(w.WatchExtension = 1) AND ((w.ExtensionType IS NULL) OR
([System.Storage.Store].[IsOfExtensionType](e.ItemId,
e.TypeFamilyId, w.ExtensionType) = 1)) AND
e._TombstoneStatus <>0 AND
e._ChangeTrackingInfo.LastUpdateLocalTS >= w.LowWatermark AND
e._ChangeTrackingInfo.LastUpdateLocalTS not IN
(select ts From tempdb.dbo.[System. Storage.Watcher.Duplicates]
d WHERE d.SessionId = @SqlSessionId AND WatcherId = w.WatcherId
AND d.ItemId = e.ItemId AND d.ExtOrRelId = e.TypeFamilyId)
  UNION ALL
  SELECT w.WatcherId, 7 as eventType, r.SourceItemId,
r.relationshipId, r.ChangeTrackingInfo.CreationLocalTS as
timeStamp, CONVERT(bigint, min_active_rowversion( )) as lwm,
t._PathHandle
FROM tempdb.dbo.[System.Storage.Watcher.Parameters] w CROSS
APPLY
[System.Storage.Store].[Tombstone!ItemsInDomain](w.DomainRoot) t
INNER JOIN [System.Storage.Store].[Master!Relationship] r ON
t.TargetItemId = r.SourceItemId
WHERE
w.SessionId = @SqlSessionId AND
w.WatchAdd = 1 AND
w.WatcherDepth = 3 AND
(w.WatchRelation = 1) AND ((w.RelationshipType IS NULL) OR
([System.Storage.Store].[IsOfRelationshipType](r.SourceItemId,
r.relationshipId, w.RelationshipType) = 1)) AND
r._ChangeTrackingInfo.CreationLocalTS >= w.LowWatermark AND
r._ChangeTrackingInfo.CreationLocalTS not IN
(select ts From tempdb.dbo.[System.Storage.Watcher.Duplicates]
d WHERE SessionId = @SqlSessionId AND WatcherId = w.WatcherId
AND d.ItemId = r.SourceItemId AND d.ExtOrRelId =
r.RelationshipId)
UNION ALL
SELECT w.WatcherId, 8 as eventType, r.SourceItemId,
r.relationshipId, r._ChangeTrackingInfo.LastUpdateLocalTS as
timeStamp, CONVERT(bigint, min_active_rowversion( )) as lwm,
t._PathHandle
FROM tempdb.dbo.[System.Storage.Watcher.Parameters] w CROSS
APPLY
[System.Storage.Store].[Tombstone!ItemsInDomain](w.DomainRoot) t
INNER JOIN [System.Storage.Store].[Master!Relationship] r ON
t.TargetItemId = r.SourceItemId
WHERE
w.SessionId = @SqlSessionId AND
w.WatchUpdate = 1 AND
w.WatcherDepth = 3 AND
(w.WatchRelation = 1) AND ((w.RelationshipType IS NULL) OR
([System.Storage.Store].[IsOfRelationshipType](r.SourceItemId,
r.relationshipId, w.RelationshipType) = 1)) AND
r._ChangeTrackingInfo.LastUpdateLocalTS >= w.LowWatermark AND
```

APPENDIX B-continued

```
r._ChangeTrackingInfo.LastUpdateLocalTS >
r._ChangeTrackingInfo.CreationLocalTS AND
r._ChangeTrackingInfo.LastUpdateLocalTS not IN
(select ts From tempdb.dbo.[System.Storage.Watcher.Duplicates]
d WHERE SessionId = @SqlSessionId AND WatcherId = w.WatcherId
AND d.ItemId = r.SourceItemId AND d.ExtOrRelId =
r.RelationshipId)
UNION ALL
SELECT w.WatcherId, 9 as eventType, r.SourceItemId,
r.relationshipId, r._ChangeTrackingInfo.LastUpdateLocalTS as
timeStamp, CONVERT(bigint, min_active_rowversion( )) as lwm,
t._PathHandle
FROM tempdb.dbo.[System.Storage.Watcher.Parameters] w CROSS
APPLY
[System.Storage.Store].[Tombstone!ItemsInDomain](w.DomainRoot) t
INNER JOIN [System.Storage.Store].[Tombstone!Relationship] r ON
t.TargetItemId = r.SourceItemId
WHERE w.SessionId = @SqlSessionId AND
w.WatchDelete = 1 AND
w.WatcherDepth = 3 AND
(w.WatchRelation = 1) AND ((w.RelationshipType IS NULL) OR
([System.Storage.Store].[IsOfRelationshipType] (r.SourceItemId,
r.relationshipId, w.RelationshipType) = 1)) AND
r._TombstoneStatus <>0 AND
r._ChangeTrackingInfo.LastUpdateLocalTS >= w.LowWatermark AND
r._ChangeTrackingInfo.LastUpdateLocalTS not IN
(select ts From tempdb.dbo.[System.Storage.Watcher.Duplicates]
d WHERE SessionId = @SqlSessionId AND WatcherId = w.WatcherId
AND d.ItemId = r.SourceItemId AND d.ExtOrRelId =
r.RelationshipId)
)ORDER BY WatcherId, timeStamp ASC
), timeout 30000
```

What is claimed:

1. A storage platform comprising:
a database engine;
a data store implemented on the database engine for storing data therein;
an application programming interface that enables application programs to issue requests for notification of a change to one or more specified elements stored in the data store; and
a data structure comprising a plurality of parameter tables, each one of the plurality of parameter tables configured to respectively store information regarding requests from entities with a same security context, wherein:
requests from at least two entities subject to having the same security context are multiplexed to form a combined query of the database engine;
a first change notification request from a first entity of said at least two entities has a first security context for accessing said data store;
a second change notification request from a second entity of said at least two entities has a second security context for accessing said data store; and
said first change notification request and said second change notification request are directed to a same parameter table of said plurality of parameter tables.

2. The storage platform of claim 1, wherein the data structure stores information identifying one or more elements of the data stored in the data store as a subject of at least one of said multiplexed requests, and wherein said combined query references said data structure.

3. The storage platform of claim 2, wherein said data structure stores, for each such element of the data identified as the subject of at least one of said multiplexed requests, information identifying a type of change to said subject element for which notification has been requested.

4. The storage platform of claim 2, where said combined query comprises reference information identifying said data structure.

5. The storage platform of claim 2, wherein if an additional request for notification of a change to one or more specified elements stored in the data store is received, additional information is added to said data structure, said additional information identifying one or more elements of the data stored in the data store as the subject of said additional request.

6. The storage platform of claim 2, wherein said data structure further stores, for each of said multiplexed requests, requestor information identifying a requestor for said multiplexed request, and wherein, when a change is returned by said combined query relevant to one of said multiplexed requests, said requestor information is used to return information to a corresponding requestor.

7. The storage platform of claim 1, where said storage platform implements a security scheme to govern access to the data store, and wherein said multiplexing of requests occurs only for requests which are similar with respect to their access available to said data store under said security scheme.

8. The storage platform of claim 1,
further comprising at least one additional data store;
wherein said application programming interface enables application programs to issue requests for notification of a change to one or more specified elements stored in any of said data stores; and
wherein said multiplexing of requests occurs only for requests directed at the same data store.

9. A computer-implemented method for handling a first change notification request for notification of a first change to data in a data store and a second change notification request for notification of a second change to data in a data store, comprising:
receiving via the computer, said first change notification request;
determining that said first change notification has a first security context for accessing said data store;
storing information regarding the first change notification request as a first parameter entry in a first parameter table of a data structure;
submitting a query to said data store, said query calculated to indicate an occurrence of said first change;
receiving said second change notification request;
determining that said second change notification request has a second security context for accessing said data store;
examining said second change notification request for determining: a) that the request is directed to the first parameter table and b) that the second security context is similar to the first security context; and
subject to said second change notification request a) being directed to the first parameter table and b) having said second security context similar to the first security context:
storing information regarding the second change notification request as a second parameter entry in the first parameter table of the data structure; and
altering said previously submitted query via access to said data structure without resubmission of said previously submitted query, so that said previously submitted query is thereafter calculated to indicate an occurrence of at least one of said first change or said second change;
else, when said second change notification request is a) not directed to the first parameter table or b) has said second security context different than said first security context:
storing information regarding the second change notification request as a first parameter entry in a second parameter table of the data structure; and
submitting a new query independent of said previously submitted query, the new query calculated to indicate an occurrence of said second change.

10. The method of claim 9, where said previously submitted query comprises a reference to the first parameter table, where said first parameter table comprises at least one query parameter describing said first change for notification, and where said step of altering said query comprises adding at least one query parameter concerning said second change to said first parameter table.

11. The method of claim 9, where said previously submitted query comprises a reference to the first parameter table, where said first parameter table comprises at least one query parameter describing said first change for notification, and where said step of altering said query consists of adding at least one query parameter concerning said second change to said first parameter table.

12. A computer-readable storage medium having instructions stored thereon for causing a computer to perform a method of handling a first change notification request for notification of a first change to data in a data store and a second change notification request for notification of a second change to data in a data store, said method comprising:
receiving said first change notification request;
determining that said first change notification has a first security context for accessing said data store;
storing information regarding the first change notification request as a first parameter entry in a first parameter table of a data structure;
submitting a query to said data store, said query calculated to indicate an occurrence of said first change;
receiving said second change notification request;
determining that said second change notification has a second security context for accessing said data store;
examining said second change notification request for determining: a) that the request is directed to the first parameter table and b) that the second security context is similar to the first security context; and
subject to said second change notification request a) being directed to the first parameter table and b) having said second security context similar to the first security context:
storing information regarding the second change notification request as a second parameter entry in the first parameter table of the data structure; and
altering said previously submitted query via access to said data structure without resubmission of said previously submitted query, so that said previously submitted query is thereafter calculated to indicate an occurrence of at least one of said first change or said second change;
else, when said second change notification request is a) not directed to the first parameter table or b) has said second security context different than said first security context:
storing information regarding the second change notification request as a first parameter entry in a second parameter table of the data structure; and
submitting a new query independent of said previously submitted query, the new query calculated to indicate an occurrence of said second change.

13. The computer-readable storage medium of claim 12, where said previously submitted query comprises a reference to said first parameter table, where said first parameter table comprises at least one query parameter describing said first change for notification, and where said step of altering said query comprises adding at least one query parameter concerning said second change to said first parameter table.

14. The computer-readable storage medium of claim 12, where said previously submitted query comprises a reference to said first parameter table, where said first parameter table comprises at least one query parameter describing said first change for notification, and where said step of altering said query consists of adding at least one query parameter concerning said second change to said first parameter table.

* * * * *